US 12,311,884 B2

United States Patent
Watson et al.

(10) Patent No.: US 12,311,884 B2
(45) Date of Patent: May 27, 2025

(54) BOX STEP WITH MULTI-PURPOSE LIGHTING

(71) Applicant: Magna Exteriors Inc., Concord (CA)

(72) Inventors: Bradley E. Watson, Barrie (CA); Deane Nelson, Toronto (CA)

(73) Assignee: MAGNA EXTERIORS, INC., Aurora (CA)

( * ) Notice: Subject to any disclaimer, the term of this patent is extended or adjusted under 35 U.S.C. 154(b) by 287 days.

(21) Appl. No.: 17/871,007

(22) Filed: Jul. 22, 2022

(65) Prior Publication Data

US 2023/0022042 A1    Jan. 26, 2023

Related U.S. Application Data

(60) Provisional application No. 63/224,983, filed on Jul. 23, 2021.

(51) Int. Cl.
| | |
|---|---|
| *B60R 3/02* | (2006.01) |
| *B60Q 1/00* | (2006.01) |
| *B60Q 1/30* | (2006.01) |
| *B60Q 1/32* | (2006.01) |

(52) U.S. Cl.
CPC .............. *B60R 3/02* (2013.01); *B60Q 1/0076* (2013.01); *B60Q 1/30* (2013.01); *B60Q 1/325* (2022.05); *B60Q 1/0088* (2013.01)

(58) Field of Classification Search
CPC .......... B60R 3/02; B60Q 1/0076; B60Q 1/30; B60Q 1/325; B60Q 1/0088; B60Q 1/0011; B60Q 1/24; B60Q 1/247; B60Q 1/2615; B60Q 1/2661; B60Q 1/307; B60Q 1/32; B60Q 1/2638; B60Q 1/2642; B60Q 2400/00; B60Q 2500/30
See application file for complete search history.

(56) References Cited

U.S. PATENT DOCUMENTS

| | | | | |
|---|---|---|---|---|
| 1,136,583 | A * | 4/1915 | Blake | B60R 3/02 362/481 |
| 1,736,616 | A * | 11/1929 | Miller | B60Q 1/325 362/495 |
| 4,116,457 | A * | 9/1978 | Nerem | B60R 3/02 280/166 |

(Continued)

FOREIGN PATENT DOCUMENTS

| | | |
|---|---|---|
| CA | 3077998 A1 | 10/2020 |
| CN | 211399696 U | 9/2020 |

(Continued)

OTHER PUBLICATIONS

Canadian Office Action for Application No. 3168677 mailed Oct. 23, 2023.

*Primary Examiner* — Steve Clemmons
(74) *Attorney, Agent, or Firm* — Warn Partners, P.C.

(57) ABSTRACT

A box step lighting arrangement for a vehicle which includes a mount for attachment to a vehicle. A step member and a linkage are connected to the mount, the linkage move the step member between a deployed position and retracted position. A motor is attached to the linkage to move the step between a deployed position and retracted position. Connected to the linkage is at least one light module. The light module has at least one light projection element that projects light onto the step member and the ground beneath the step member.

12 Claims, 5 Drawing Sheets

(56) References Cited

U.S. PATENT DOCUMENTS

| | | | | |
|---|---|---|---|---|
| 4,557,494 A * | 12/1985 | Elwell | | B60R 3/002 24/514 |
| 4,893,226 A * | 1/1990 | Neece | | B60Q 1/2642 362/293 |
| 5,101,326 A * | 3/1992 | Roney | | F21S 43/14 362/800 |
| 6,250,785 B1 * | 6/2001 | Mallia | | B60R 3/002 362/555 |
| 7,621,546 B2 * | 11/2009 | Ross | | B60R 3/02 280/727 |
| 8,007,148 B2 * | 8/2011 | Yamauchi | | B60Q 1/2626 362/501 |
| 8,056,913 B2 * | 11/2011 | Kuntze | | B60R 3/002 280/166 |
| 8,827,294 B1 * | 9/2014 | Leitner | | B60R 3/02 280/166 |
| 8,844,957 B2 * | 9/2014 | Leitner | | B60R 3/02 280/166 |
| 9,248,778 B2 * | 2/2016 | Ford | | B60Q 1/52 |
| 9,440,579 B2 * | 9/2016 | Salter | | B60Q 1/2661 |
| 9,499,093 B1 * | 11/2016 | Salter | | B60Q 1/325 |
| 10,155,474 B2 * | 12/2018 | Salter | | B60Q 1/52 |
| 10,202,071 B2 * | 2/2019 | Hoek | | B60R 3/002 |
| 10,358,080 B2 * | 7/2019 | Chen | | B60Q 1/2626 |
| 10,377,300 B1 * | 8/2019 | Salter | | B60R 3/002 |
| 10,479,267 B2 * | 11/2019 | Salter | | F21S 43/26 |
| 10,543,778 B2 * | 1/2020 | Chen | | F21S 43/40 |
| 10,562,460 B2 * | 2/2020 | Forgette | | B60J 7/11 |
| 10,807,519 B2 * | 10/2020 | Reinken | | B60R 3/00 |
| 10,907,803 B2 * | 2/2021 | Andersson | | B60Q 3/60 |
| 10,967,822 B1 * | 4/2021 | Ramos, II | | B60Q 1/2619 |
| 10,981,512 B2 * | 4/2021 | Crandall | | B60R 3/002 |
| 11,208,044 B2 * | 12/2021 | Smith | | B60R 3/02 |
| 2008/0116653 A1 * | 5/2008 | Piotrowski | | B60R 3/002 280/166 |
| 2015/0291086 A1 | 10/2015 | Salter et al. | | |
| 2017/0274940 A1 * | 9/2017 | Povinelli | | B60R 11/00 |

FOREIGN PATENT DOCUMENTS

| | | | | |
|---|---|---|---|---|
| DE | 102014109440 A1 * | 1/2015 | | B60Q 1/00 |
| EP | 3459791 A1 * | 3/2019 | | |
| GB | 2527308 A * | 12/2015 | | B60Q 1/00 |
| JP | 3150358 U * | 5/2009 | | B60Q 1/0483 |

* cited by examiner

BOX STEP WITH MULTI-PURPOSE LIGHTING

FIELD OF THE INVENTION

The present invention relates to a box step with multi-purpose lighting.

BACKGROUND OF THE INVENTION

Retractable box steps are often used on pick up truck style vehicles as well as on larger trucks and sport utility vehicles where are user desired to be able to reach into a cargo area or the roof a vehicle. Box steps are mounted to the vehicle frame and move between an extended and retracted position. Some box steps are motorized and are connected to a power source, however, lights are not employed on the box steps, which can make it difficult for a user to see the step at night. It is desirable to provide a box step lighting arrangement that illuminates the step for a user to see the step location at night. It is further desirable to illuminate other areas including the ground area beneath the box step and the area of a hitch located in the vicinity of the box steps. It is yet an additional object of the invention to provide illumination on the box step that is usable as a signal to oncoming vehicles and is able to provide illumination benefits in both the retracted and extended positions.

SUMMARY OF THE INVENTION

A box step lighting arrangement for a vehicle which includes a mount for attachment to a vehicle. A step member and a linkage are connected to the mount, the linkage move the step member between a deployed position and retracted position. A motor is attached to the linkage to move the step between a deployed position and retracted position. Connected to the linkage is at least one light module. The light module has at least one light projection element that projects light onto the step member and the ground beneath the step member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
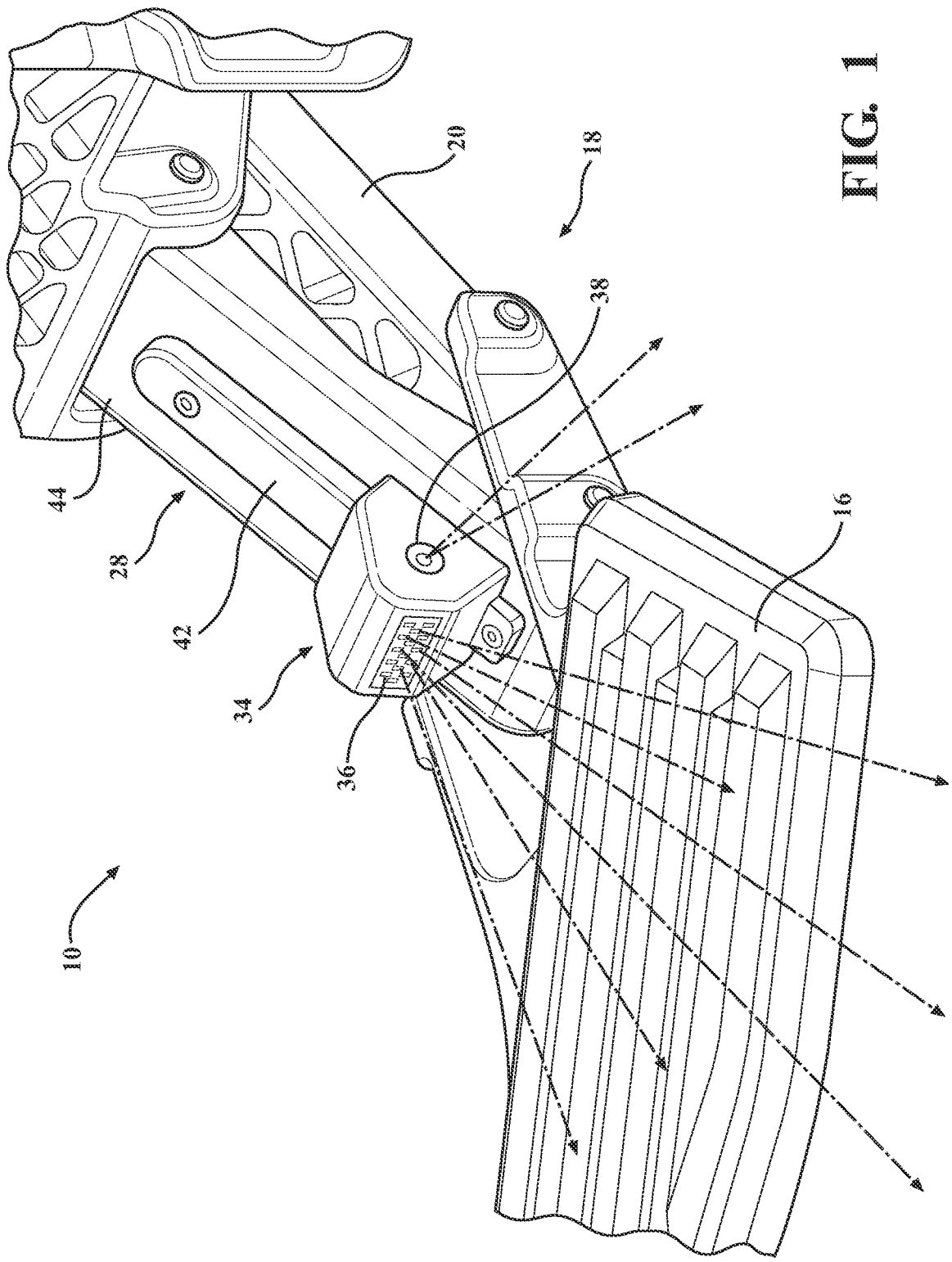
FIG. 1 is an enlarged front perspective view of the box step lighting arrangement.

The following description of the preferred embodiment(s) is merely exemplary in nature and is in no way intended to limit the invention, its application, or uses.

Referring now to FIGS. 1 to 4 there is shown a box step lighting arrangement 10 for a vehicle is shown. While a box step lighting arrangement 10 is depicted, it is within the scope of this invention for the box step to be a vehicle side step or some other step besides a step for a vehicle box. Such articulating steps and powered running boards and the like are shown in commonly assigned U.S. Pat. No. 7,118,120 issued Oct. 10, 2006 entitled "Powered Running Board"; and U.S. Patent Application 62/769,240 filed Nov. 19, 2018 entitled "Power Retractable Bumper Step" which are incorporated by reference herein. The box step lighting arrangement 10 includes a mount 12 for attachment to a portion 14 of a vehicle. The portion 14 of the vehicle is typically the vehicle frame or bumper, however, any portion of the vehicle having suitable strength can be used. There is also a step member 16 and a linkage 18. The linkage 18 is connected between the mount 12 and the step member 16. The linkage 18 and the step member 16 connected thereto, articulate between a retracted position and a deployed position. A motor 19 is attached to the linkage 18 to provide movement of the linkage 18 and step member 16.

The linkage 18 is a four bar link assembly that includes a rear leg 20 having a first pivot connection to the mount 12 and a second pivot connection 24 to a step base 26. The first pivot connection is driven by a connection to the motor 19. The linkage 18 also includes a front leg 28 having a first pivot connection 30 to the mount 12 and a second pivot connection 32 to the step base 26. The rear leg 20 and the front leg 28 rotate together between the retracted position shown in FIG. 3 and the deployed position show in FIG. 4. The step member 16 as shown is an integrated portion of the step base 26. However, it is within the scope of the invention for the step member 16 to be a separate component that is connected to the step base 26.

Figure 2:
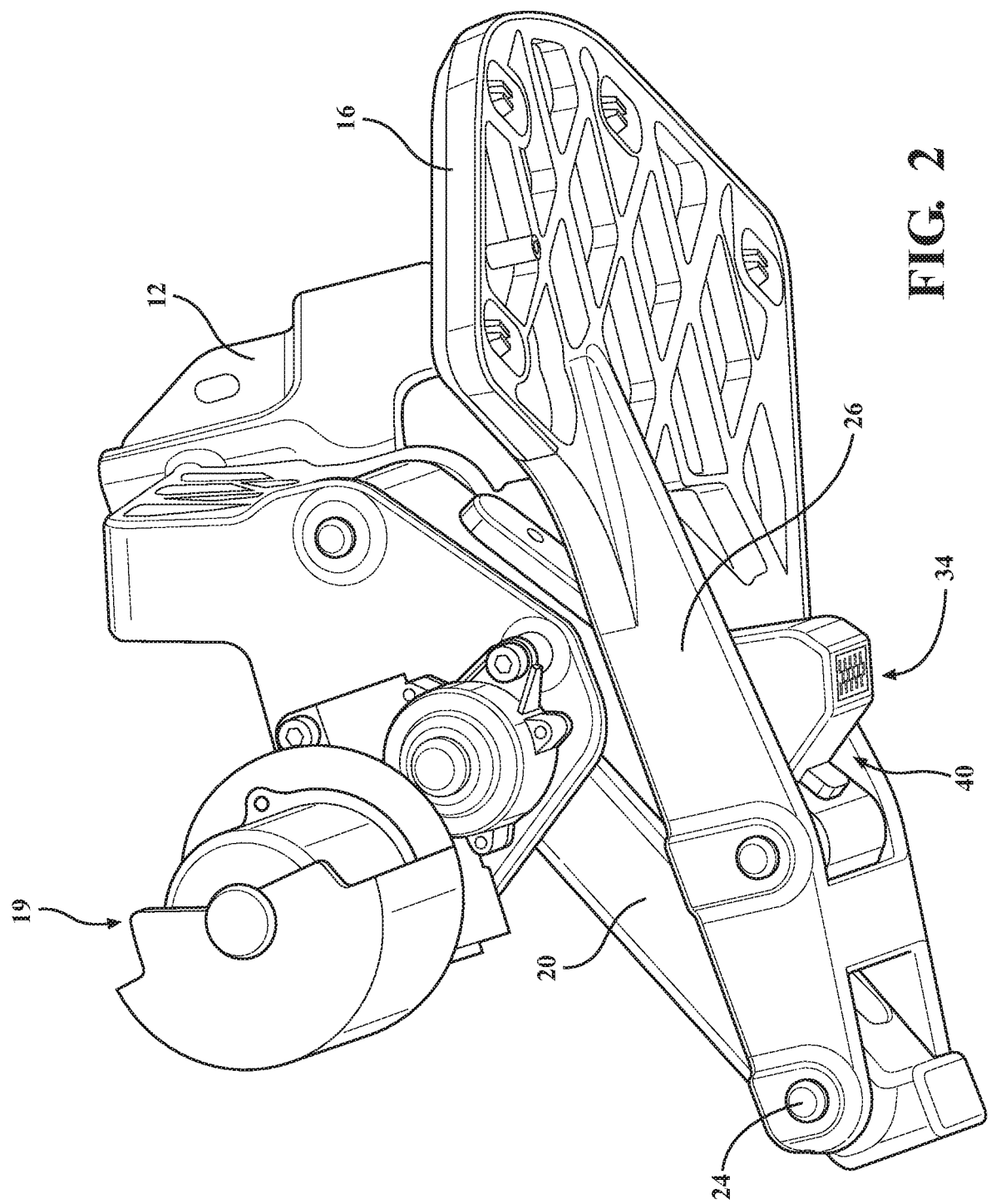
FIG. 2 is an elevational bottom perspective view of the box step lighting arrangement in the retracted position.
Figure 3:
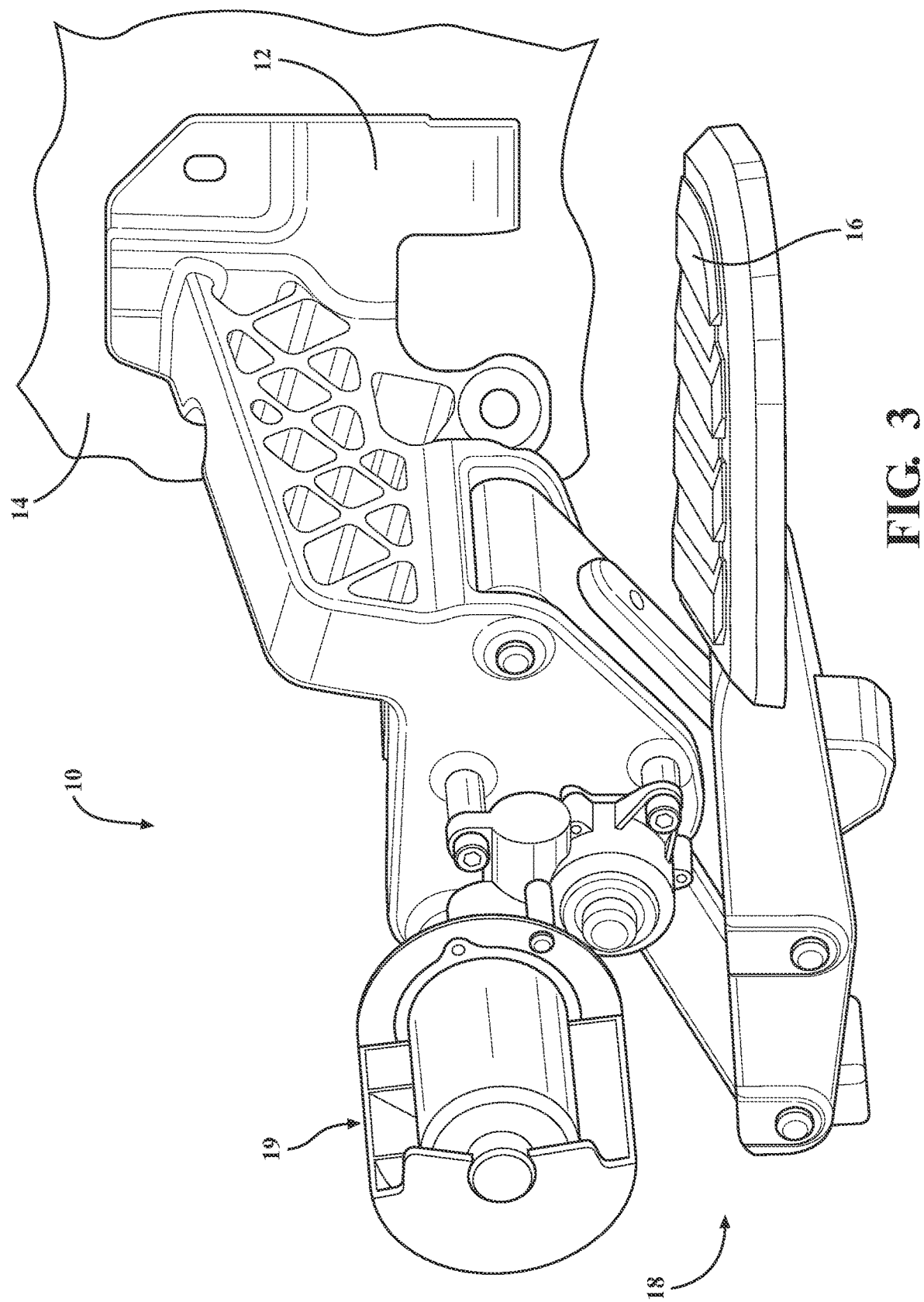
FIG. 3 is a side elevational perspective view of the box step lighting arrangement in the retracted position.
Figure 4:
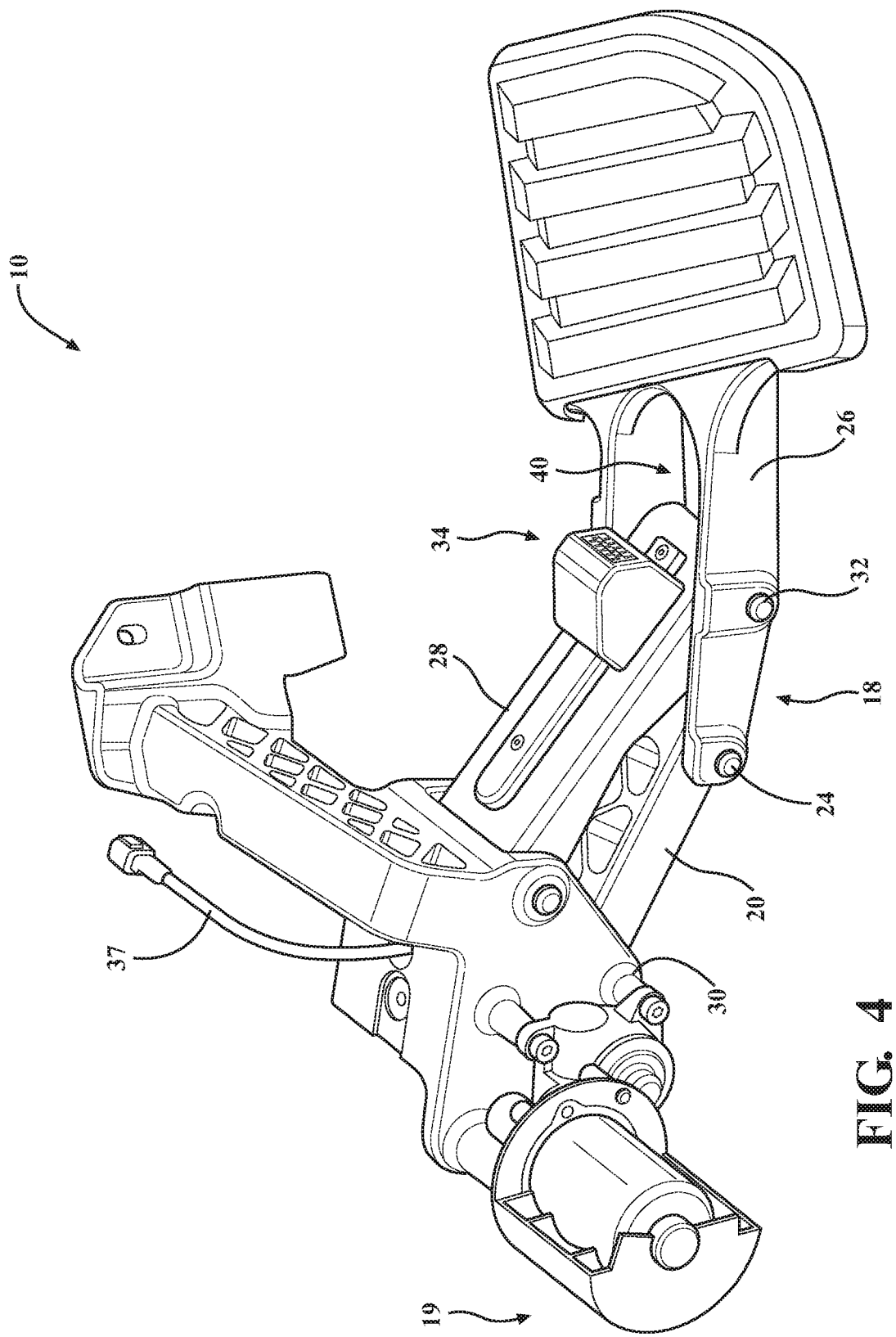
FIG. 4 is a top side perspective view of the box step lighting arrangement in the extended position.

Connected to the front leg 28 is a light module 34 having a light projection element 36 that when energized projects light from light projection element onto the step portion 16 and the ground beneath the step portion 16. The light module 34 is a housing for the light projection element 36. The light projection element is a light source that is a light emitting diode, a plurality of light emitting diodes, an incandescent light bulb, a plurality of incandescent bulbs or any other suitable light source. In another aspect of the invention the light module includes a hitch light projection element 38 that projects light in a different direction toward a trailer hitch. The hitch projection element 38 is typically illuminated when the linkage 18 is in the retracted position as shown in FIG. 2. The hitch projection element 38 can be connected using a light pipe or reflectors to the light projection element 36 or the hitch projection element 38 can have its own light source which can be a light emitting diode, a plurality of light emitting diodes, an incandescent light bulb, a plurality of incandescent bulbs or any other suitable light source. When in the retracted position the light module 34 extends through an open area 40 in the step base 26 so that light projecting from the hitch light projection element 38 shines on the hitch. The light module 34 connects to a rail 42 that is formed on or connected to a front surface 44 of the front leg 28. The light module 34 can be adjusted and locked to a desired location along the rail 42. Additionally, the rail 42 can be used to connect additional light modules depending on the need of a particular application. The light module 34 and the motor 19 are both connected to and receive power through a wiring harness 37 that is connected to a power source on the vehicle.

Figure 5:
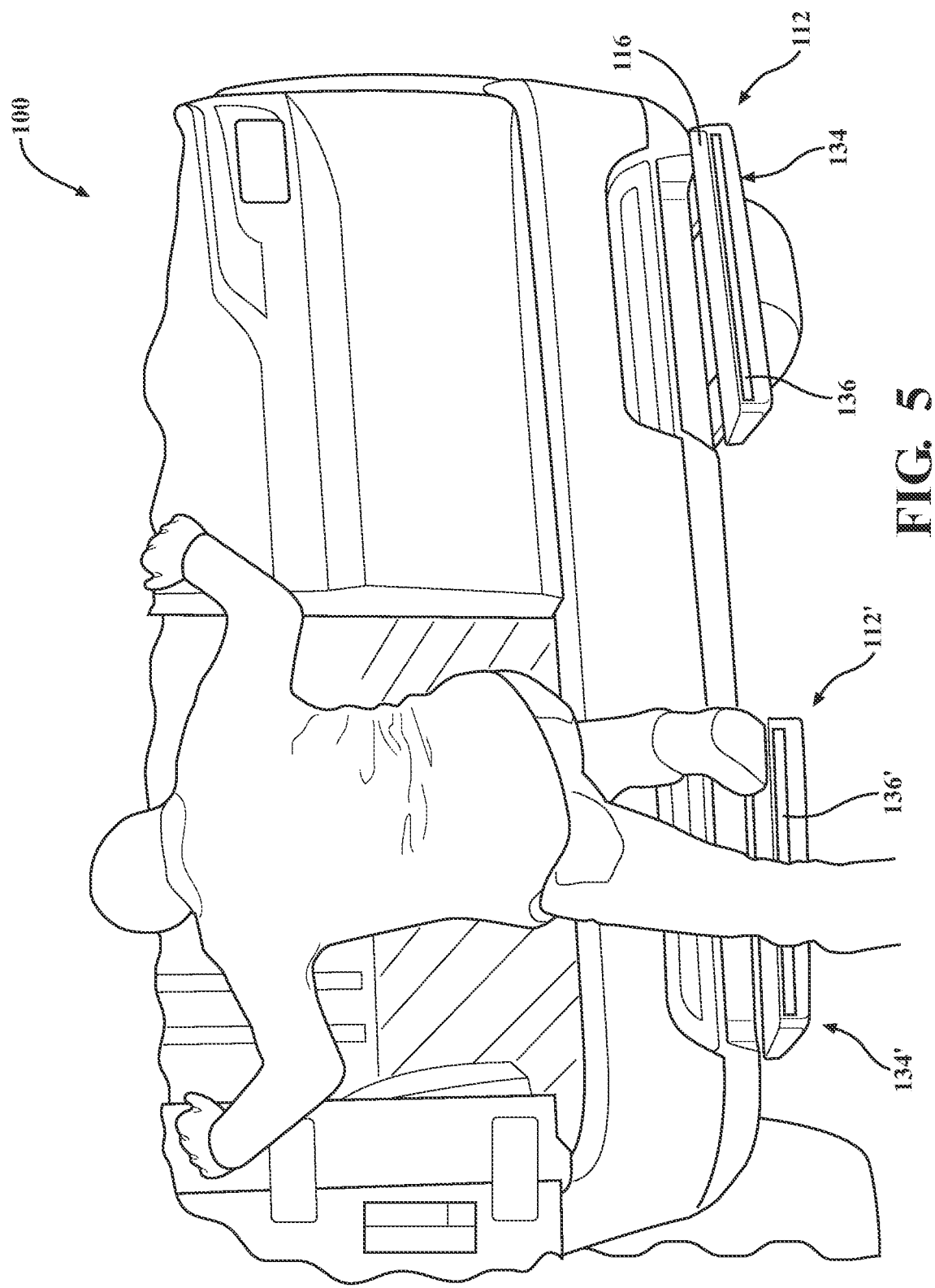
FIG. 5 is a rear perspective view of a vehicle with a box step lighting arrangement according to an alternate embodiment of the invention.

Referring now to FIG. 5 an alternate embodiment of a box step lighting arrangement 100 is shown. This embodiment shows two box steps 112, 112' each with a light module 134 integrated with in a step portion 116. While two box steps 112, 112' are shown it is within the scope of this invention for a greater or lesser number of box steps 112, 112' to be utilized depending on the need of a particular application. The light module 134 has a light projection element 136 that projects a signal light that is visible from behind the vehicle so that an oncoming vehicle or person will see the light projection element 136 when illuminated. The signal light also projects light onto the ground beneath and rearward of the vehicle. The light projection element 136 also helps a user see the location of the step portion 116 when ambient light conditions are poor. The light projection element 136 is a light source that is a light emitting diode, a plurality of light emitting diodes, an incandescent light bulb, a plurality of incandescent bulbs or any other suitable light source.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A box step lighting arrangement comprising:
   a box step mounted to a vehicle and having a step member moveable between a deployed position and a retracted position;
   at least one light module connected to the box step, wherein the at least one light module has at least one light projection element that projects light onto the step member;
   a mount for attachment to a portion of a vehicle;
   a linkage connected between the step member and the mount, wherein the linkage is a four bar link assembly that includes a rear leg having a first pivot connection to the mount and a second pivot connection to a step base that is connected to the step member and the linkage further includes a front leg having a first pivot connection to the mount and a second pivot connection to the step base, wherein the rear leg and the front leg rotate together between the retracted position and the deployed position, and
   an open area in the step base, wherein the at least one light module extends through the open area and the at least one light module is partially positioned below the step base and the step member when the box step is in the retracted position, so that light from the at least one light module projects light onto a ground beneath the step member.

2. The box step lighting arrangement of claim 1, wherein the first pivot connection of the rear leg is connected to a motor, wherein the motor drives the rear leg.

3. The box step lighting arrangement of claim 1 further comprising:
   a rail on a front surface of the front leg, wherein the at least one light module is slidably connected to the rail and is moveable on the rail to a desired location.

4. The box step lighting arrangement of claim 1, wherein the at least one light module further comprises a hitch light projection element that projects light in a different direction toward a trailer hitch.

5. The box step lighting arrangement of claim 1 further comprising a switch connected to the at least one light module for manually turning the at least one light projection element on and off.

6. A box step lighting arrangement comprising:
   a mount for attachment to a vehicle;
   a step member;
   a linkage connecting the mount and the step member for stowing and deploying the step member;
   a motor attached to the linkage to move the step member between a deployed position and a retracted position;
   at least one light module connected to the linkage, wherein the at least one light module has at least one light projection element that projects light onto the step member;
   a linkage connected between the step member and the mount, wherein the linkage is a four bar link assembly that includes a rear leg having a first pivot connection to the mount and a second pivot connection to a step base that is connected to the step member and the linkage further includes a front leg having a first pivot connection to the mount and a second pivot connection to the step base, wherein the rear leg and the front leg rotate together between the retracted position and the deployed position, and
   an open area in the step base, wherein the at least one light module extends through the open area and the at least one light module is partially positioned below the step base and the step member when the box step is in the retracted position, so that light from the at least one light module projects light onto a ground beneath the step member.

7. The box step lighting arrangement of claim 6 further comprising a switch connected to the at least one light module for manually turning the at least one light projection element on and off.

8. The box step lighting arrangement of claim 6 wherein the linkage comprises a four bar link assembly for raising and lowering the step member.

9. The box step lighting arrangement of claim 6, wherein the first pivot connection of the rear leg is connected to the motor, wherein the motor drives the rear leg.

10. The box step lighting arrangement of claim 6 further comprising:
    a rail on a front surface of the front leg, wherein the at least one light module is slidably connected to the rail and is moveable on the rail to a desired location.

11. The box step lighting arrangement of claim 6, wherein the at least one light module further comprises a hitch light projection element that projects light in a different direction toward a trailer hitch.

12. The box step lighting arrangement of claim 6 wherein the at least one light module and the motor are both connected to and receive power through a wiring harness.

* * * * *